Feb. 19, 1946.  D. H. ROWLAND  2,395,295

METHOD OF PRODUCING INSULATORS

Filed June 7, 1944  2 Sheets-Sheet 1

Inventor
Davidge H. Rowland,

By
His Attorney

Inventor
Davidge H. Rowland,

Patented Feb. 19, 1946

2,395,295

UNITED STATES PATENT OFFICE 2,395,295

METHOD OF PRODUCING INSULATORS

Davidge H. Rowland, Sewickley, Pa.

Application June 7, 1944, Serial No. 539,097

8 Claims. (Cl. 25—156)

This invention relates to the production of ceramic or porcelain bodies or members and more particularly to a method and apparatus for forming such bodies by "plunging."

The two well known and accepted methods of making wet process high voltage insulators, for example, are "jiggering" and "plunging." In both methods, plaster molds are used to hold the clay and form one surface of the insulator while the jiggering profile or metal plunger imparts the required contour to the other side. The plunging method is more rapid and lends itself to modern mass production more than the jiggering method but, as now employed, the clay must usually be partially shaped by hand before the plunger is used. This hand operation is quite expensive and, up to the present, no means has been discovered for mechanically imparting the required shape to the clay before the plunging operation, with the result that present methods of plunging insulators are only about 20% mechanized.

It has been observed that insulators formed by the jiggering process are much less liable to crack than those formed by the plunging process and the reason for this has not been known. I have found that these failures are due to stresses and strains which are set up in the body at the time of the plunging operation. This is due to the fact that porcelain clay is not truly a plastic material and, when suddenly distorted by some mechanical means, it has a tendency to resume its original shape. Parts of the clay, therefore, which are distorted more and may be subjected to greater pressure than others in the forming operation may, therefore, have greater internal stresses than others and the portions of the clay having the greatest internal stresses quite often relieve themselves by cracking.

Where hand shaping of the clay is resorted to before the clay is subjected to the plunging action it is seldom possible to shape the clay in the precise form desired and also to center the shaped clay properly in the mold.

Under such circumstances, therefore, portions of the ceramic body will be subjected to internal stresses which frequently result in cracks during the drying process and render the body imperfect or unfit for service.

The principal object of the present invention, therefore, is to provide a plunging process and apparatus for forming a ceramic body, such as a porcelain insulator for example, which will be substantially free of internal stresses.

Another object of the invention is to provide a plunging process and apparatus for forming ceramic bodies, such as a porcelain insulator for example, which eliminates the necessity of partially shaping the ceramic material by hand.

The principal feature of the invention consists in employing a mold having an open passageway whereby a portion of the ceramic material placed in the mold may be extruded through the passageway and the extruded portion subsequently removed.

Other features of the invention, residing in advantageous forms, combinations and relations of parts, will hereinafter appear and be pointed out in the claims.

Figure 1:
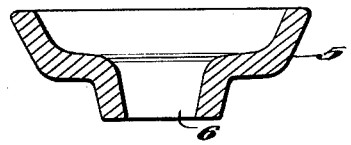
Figure 1 is a vertical sectional view of a plaster mold for such insulators embodying my invention.

While I have chosen a mold and plungers of a character which may be employed in forming high tension insulators in order to illustrate my invention, it will, of course, be understood that the invention is not limited to the particular configuration of the mold and plungers shown in the drawings.

In the plunging process for making high tension insulators as now practiced, a mold having a closed bottom is employed. It is formed with a main body portion having a contour like the skirt or main body portion of the insulator and with a centrally located recess. The ceramic material which is placed in the mold is first formed by hand into the shape of a cone and then positioned with its smallest end projecting into the recess. In addition to shaping the ceramic material by hand in this manner so that some of it will extend into the recess, the material can be "wedged" against the side walls of the recess in an endeavor to support it in an upright position and to center it with respect to the mold as a whole.

As pointed out above, this process of hand shaping the ceramic material is time consuming and expensive and the material is frequently not shaped symmetrically or is not "wedged" sufficiently in the recess with the result that it is not held upright and is not centered with respect to the mold. The parts of the insulator, therefore, particularly the cap, i. e. the portion formed within the recess of the mold, frequently become internally stressed to such extent that cracks develop in the ceramic body during the drying process.

To render hand shaping unnecessary and at the same time to permit of the forming of a ceramic body which has an offset portion, such as the cap of a high tension insulator for example, by the plunging process, I have devised a mold having an open passageway of substantially the same cross section as the offset portion to be formed so that a part of the material entering the passageway may be extruded from the mold. In this manner, substantially all portions of the material within the passageway are subjected to the same pressure and portions of that material will, therefore, not have such internal stresses as might result in the formation of cracks in the drying operation.

The mold shown in Figure 1 for a high tension insulator has a main portion 5 provided on its interior with the contour of the skirt or body portion of the insulator which is to be formed. It also has a centrally located passageway 6 which is of substantially the same shape in cross section as the cap portion of the insulator.

Figure 2:
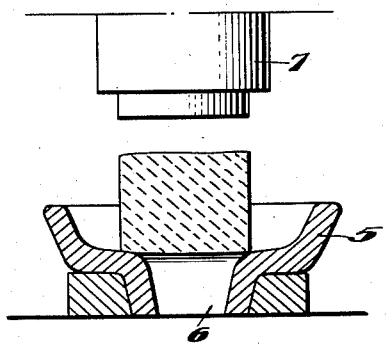
Figure 2 is a view showing the mold of Figure 1 beneath the nozzle of a pug mill and containing a measured quantity of ceramic material.

Ceramic material may be delivered to the mold in any suitable manner but it may well be moved directly under the nozzle 7 of a pug mill, as shown in Figure 2, where a measured quantity of the ceramic material somewhat in excess of that required to form the insulator is delivered directly to the mold.

Figure 3:
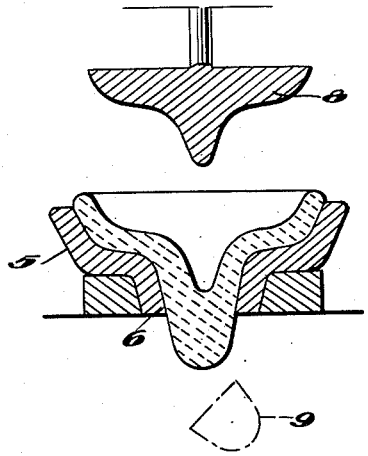
Figure 3 is a cross sectional view of a mold and the rotating plunger which, as shown, has caused the ceramic material to conform to the mold and to extrude a portion of the material through the passageway of the mold.

From there the mold is placed beneath a preliminary forming plunger 8 which, upon being forced against the ceramic material, will extrude a portion thereof beyond the passageway 6. The plunger may be advantageously shaped, as in Figure 3, so as to cause the ceramic material to conform to the contour of the mold.

The portion of the clay which is extruded may be removed in any suitable manner, not shown in the drawings. The extruded portion of the clay after it has been removed is shown in dot and dash lines in Figure 3 as indicated at 9.

Figure 4:
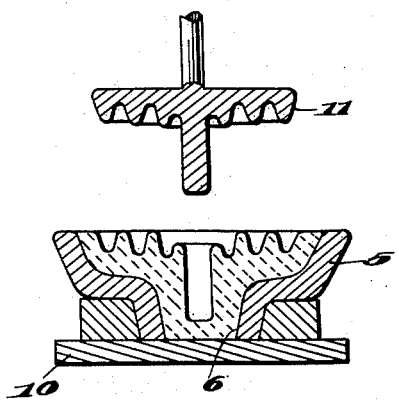
Figure 4 is a cross sectional view of the mold, the plate for closing the passageway in the mold and the plunger for imparting the desired shape to the top of the material within the mold.

After the extruded portion has been removed, the mold is placed on an oiled metal plate 10 (Figure 4) to close the outer end of the passageway thereof. The clay may then be subjected to the pressure of an additional plunger 11 (Figure 4) to give it its final form, particularly the configuration which it is desired to impart to the upper surface of the material within the mold. After this, the mold and clay therein are placed on a drying rack in such position that the material on both sides of the mold will be exposed to the drying medium.

The plunger 8 for initially upsetting the ceramic material and for extruding a part thereof through the passageway within the mold is preferably mounted so that it will rotate and also move up and down in a vibratory manner when it engages the material. This motion of the plunger may be conveniently obtained by mounting it on a shaft 12 which is carried by a suitable frame or support 13 vertically movable with respect to suitable guides or the like 14. The frame 13 is formed so as to support a motor 15 for rotating the shaft and the connection between the motor and shaft is of any well known character which will enable the shaft to move axially for a limited distance.

Figure 5:
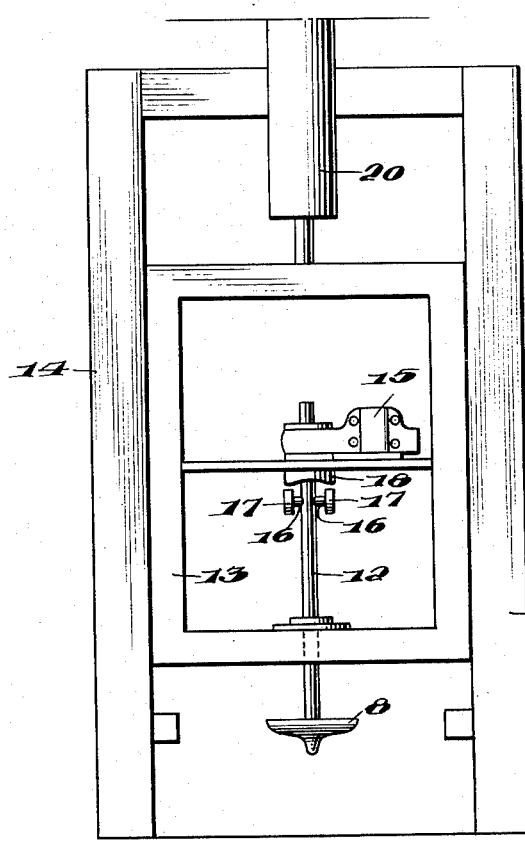
Figure 5 is a side elevational view of the mechanism whereby the plunger shown in Figure 3 may be operated.
Figure 6:
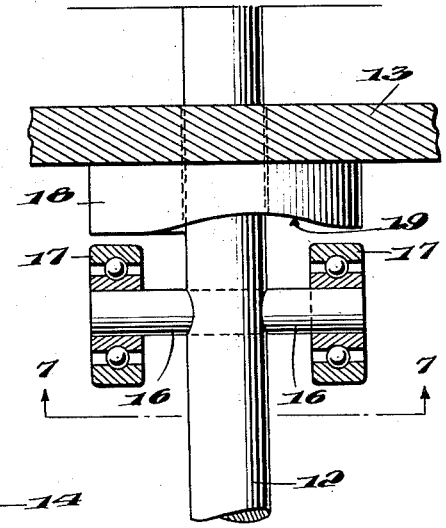
Figure 6 is an enlarged view, partly in section, of the upper portion of the shaft carrying the plunger.
Figure 7:
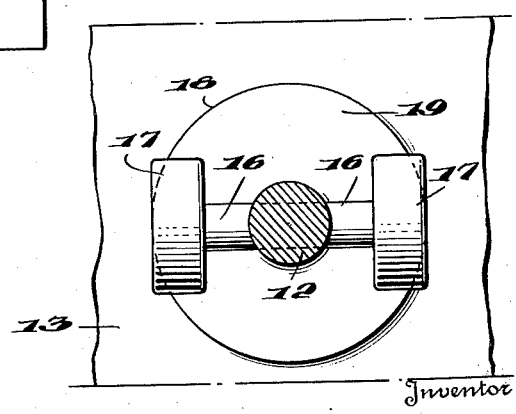
Figure 7 is a sectional view taken on line 7—7 of Figure 6.

For causing the shaft to move up and down in a vibratory manner when the plunger engages the ceramic material within the mold, the shaft may be advantageously provided with oppositely projecting arms 16 each of which has at its outer end a freely rotatable roller such as the ball bearing supported sleeves 17. Surrounding the shaft and rigidly supported by the frame 13 is an annular member 18 having an undulating surface 19 on its under side. This surface is arranged so as to be slightly above the rollers 17 when the plunger shaft is in its lowermost position with respect to the frame but when the frame descends and the plunger comes into engagement with the ceramic material, the shaft is forced upwardly and the rollers 17 are forced into engagement with the undulating surface 19. Thus the shaft 12 is caused to move axially and impart a vibratory motion to the plunger so long as the plunger presses against the ceramic material but, as soon as this pressure is relieved, the shaft ceases to vibrate since the rollers 17 are free to move out of engagement with the undulating surface 19. Any suitable thrustor, indicated at 20 in Figure 5 may be employed to cause movement of the frame 13 the amount necessary to cause the rotating and vibrating plunger to upset the ceramic material within the mold.

The plunger 11 is preferably operated in the same manner as plunger 8 but it is to be appreciated that some ceramic bodies having offset portions might be fully formed without vibrating the plungers as well as rotating them, as heretofore described and in some instances it might not be necessary to use a second plunger. Moreover, when two plungers are used, it may not be necessary to have the initial plunger cause the ceramic material to conform entirely to the shape of the mold so long as the part of the ceramic material which is first forced into the passageway of the mold and which ordinarily would possess such internal stresses as would cause cracking is extruded from the mold and is subsequently removed.

Various additions to and modifications of the process and apparatus here described, such, for example, as the automatic cutting off of the extruded portion of the ceramic material as the mold is moved from under plunger 8 to under plunger 11, will suggest themselves to those skilled in the art, and may, of course, be made without departing from the spirit and scope of the invention as defined in the appended claims.

What I claim is:

1. The method of forming a ceramic member having an offset portion, said method involving placing a quantity of clay in a mold having an open passageway of substantially the same shape in cross section as said offset portion, applying force to said clay to cause it to conform substantially to the contour of the mold and to extrude a portion thereof through said passageway, and thereafter removing said extruded portion of the clay from the portion thereof in said passageway.

2. The method of forming a ceramic member having an offset portion, said method involving placing a quantity of clay in a mold having an open passageway of substantially the same shape in cross section as that of the lateral peripheral surfaces of said offset portion, upsetting said clay and extruding a portion thereof through said passageway, removing said extruded portion of the clay from the portion thereof in said passageway, closing the outer end of said passageway, and thereafter applying force to the clay to provide it with the desired form.

3. The method of forming a ceramic member having a body provided with an offset portion, said method involving placing a quantity of clay in a mold having an open passageway therein, applying pressure to the clay to force a portion thereof into and through said passageway of greater length than said offset portion of the ceramic member, cutting off the outer end of said extruded portion which is in excess of the length of the offset portion, and applying pressure to said clay to form the body of the ceramic member.

4. The method of forming a ceramic member having a body provided with an offset portion, said method involving placing a measured quantity of clay in a mold having an open passageway in substantially the center thereof of the same shape in cross section as said offset portion, applying pressure to said clay to extrude a portion thereof through said opening of greater length than the offset portion of the ceramic member, cutting off the outer end of said extruded portion of the clay which is in excess of the length of said offset portion, and applying pressure to said clay to form the the body of the ceramic member.

5. The method of forming a high tension insulator having a body portion and a head portion, said method involving placing a quantity of clay in a mold having an open passageway in the center thereof of substantially the same shape in cross section as said head portion, applying force to said clay to cause it to conform substantially to the contour of the mold and to extrude a portion thereof through said passageway, and thereafter removing said extruded portion of the clay from the portion thereof in said passageway.

6. The method of forming a high tension insulator having a body portion and a head portion, said method involving placing a quantity of clay in a mold having an open passageway of substantially the same shape in cross section as that of the peripheral surfaces of the head portion of the insulator, extruding a portion of said clay through said passageway, removing the portion of the clay extruded beyond said passageway, closing the outer end of said passageway, and thereafter applying force to the clay to provide the body portion of the insulator with the desired form.

7. The method of forming a ceramic member having an offset portion, said method involving placing a quantity of clay in a mold having an open passageway of substantially the same shape in cross section as said offset portion, subjecting said clay to the pressure of a vibratory member for causing the clay to conform substantially to the contour of the mold and to extrude a portion thereof through said passageway, and thereafter removing said extruded portion of the clay from the portion thereof in said passageway.

8. The method of forming a ceramic member having an offset portion, said method involving placing a quantity of clay in a mold having an open passageway of substantially the same shape in cross section as said offset portion, subjecting said clay to the pressure of a rotating vibratory member for extruding a portion thereof through said passageway, removing said extruded portion of the clay from the portion thereof in said passageway, closing the outer end of said passageway, and finally subjecting the clay to the pressure of a rotating vibratory die to impart the desired configuration to the top of the clay within the mold.

DAVIDGE H. ROWLAND.